(12) United States Patent
Ulrich

(10) Patent No.: US 6,246,516 B1
(45) Date of Patent: Jun. 12, 2001

(54) MODULAR INFRARED KEPLER TELESCOPE

(75) Inventor: Wilhelm Ulrich, Aalen (DE)

(73) Assignee: Carl-Zeiss-Stiftung, Heidenheim/Brenz (DE)

(*) Notice: Subject to any disclaimer, the term of this patent is extended or adjusted under 35 U.S.C. 154(b) by 0 days.

(21) Appl. No.: 09/497,818

(22) Filed: Feb. 3, 2000

Related U.S. Application Data

(62) Division of application No. 08/971,837, filed on Nov. 17, 1997, now Pat. No. 6,057,960.

(30) Foreign Application Priority Data

Nov. 15, 1996 (DE) .............................. 196 47 273

(51) Int. Cl.[7] ........................................ G02B 5/30
(52) U.S. Cl. .................. 359/353; 359/399; 359/421; 359/422; 359/432
(58) Field of Search .................. 359/353, 399, 359/421, 422, 432

(56) References Cited

U.S. PATENT DOCUMENTS

| | | | |
|---|---|---|---|
| 4,249,793 | * 2/1981 | Uehara | 350/43 |
| 4,486,069 | 12/1984 | Neil et al. | 359/353 |
| 4,695,119 | 9/1987 | Neil . | |
| 4,715,692 | 12/1987 | Yamada et al. . | |
| 5,044,706 | 9/1991 | Chen . | |
| 5,214,532 | 5/1993 | Hall et al. . | |
| 5,229,880 | 7/1993 | Spencer et al. . | |
| 5,257,133 | 10/1993 | Chen . | |
| 5,305,147 | * 4/1994 | Hasegawa et al. | 359/644 |
| 5,363,235 | 11/1994 | Kiunke et al. . | |
| 5,548,439 | 8/1996 | Smith . | |
| 6,057,960 | * 5/2000 | Ulrich | 359/353 |

FOREIGN PATENT DOCUMENTS

| | | |
|---|---|---|
| 3110797 | 2/1982 | (DE) . |
| 58-215618 | 12/1983 | (JP) . |

OTHER PUBLICATIONS

"Infrared zoom lenses in the 1980s and beyond" by A. Mann, Optical Engineering, vol. 31, No. 5, May 1992, pp. 1064 to 1071.

* cited by examiner

*Primary Examiner*—Cassandra Spyrou
*Assistant Examiner*—Craig Curtis
(74) *Attorney, Agent, or Firm*—Walter Ottesen

(57) ABSTRACT

The invention is directed to an infrared Kepler telescope which includes an objective defining an optical axis and including a positive front group and a negative rear group all arranged on the optical axis. The objective further includes an interchangeable optic interposed between the positive front group and the negative rear group with the interchangeable optic being configured to operate as a magnification changer. An ocular is mounted on the optical axis rearward of the negative rear group and the rear group and the ocular are fixedly pregiven. The positive front group is a first positive front group and is exchangeable with at least a second positive front group. The interchangeable optic is a first interchangeable optic and is exchangeable with at least a second interchangeable optic. The first and second positive front groups are optically so configured that each one of the positive front groups undercorrects spherical aberration and coma forward of the negative rear group to the same extent with or without the interchangeable optic. It is also provided that each combination has an overall diffraction-limited correction except for the distortion. The interchangeable optics (W11, W21) generate a second field of view. The telescope having interchangeable optics (W11, W21) has a negative distortion and has a positive distortion without these interchangeable optics.

31 Claims, 3 Drawing Sheets

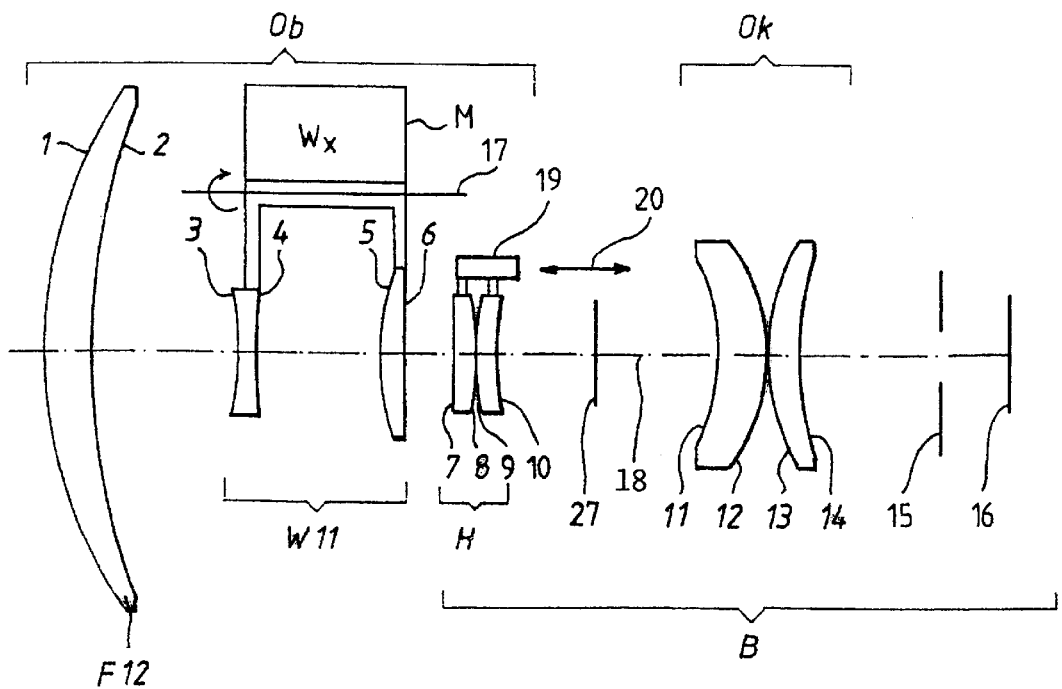
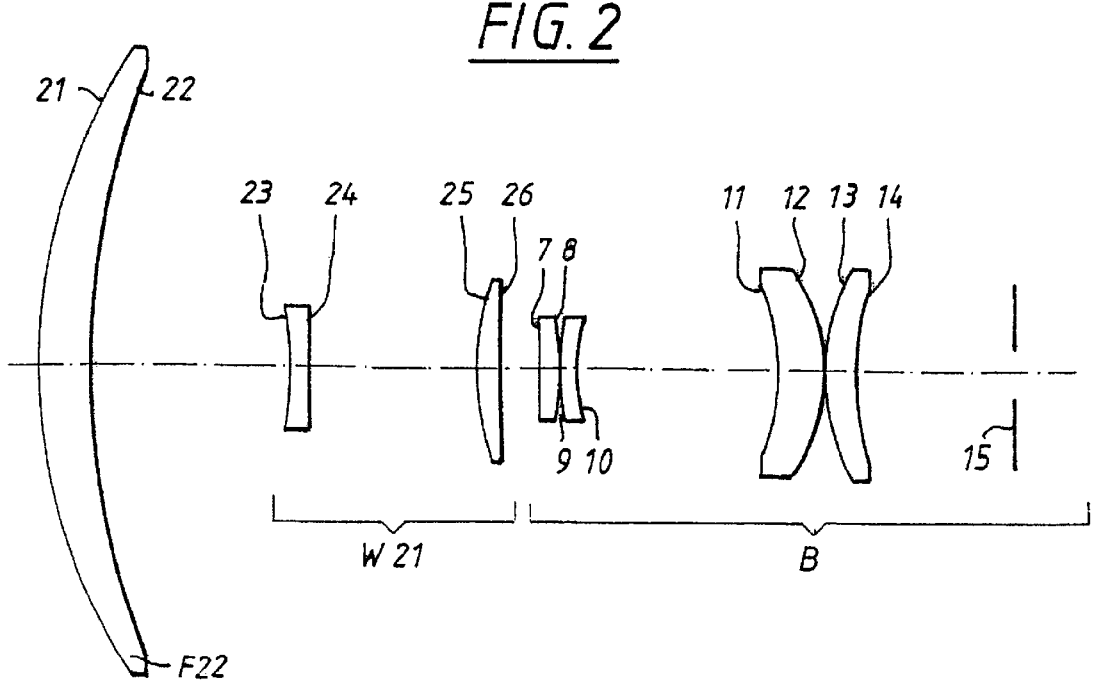

MODULAR INFRARED KEPLER TELESCOPE

This is a divisional of application Ser. No. 08/971,837, filed Nov. 17, 1997 now U.S. Pat. No. 6,057,960.

FIELD OF THE INVENTION

The invention relates to an infrared Kepler telescope, that is, an afocal optical system providing an intermediate image and including an objective and an ocular. Optics of this kind are, for example, built into thermal imaging apparatus.

BACKGROUND OF THE INVENTION

A modular zoom reimager which includes an interchangeable compensator/ocular unit is disclosed in the paper of A. Mann entitled "Infrared zoom lenses in the 1980s and beyond" published in Optical Engineering, 31 (5), pages 1064 to 1071 (May 1992).

U.S. Pat. No. 5,044,706 discloses a telescope (Galilei, afocal) having a focal length (field of view) which can be changed by insertable lens groups. Diffractive optical elements and aspheric elements are provided in the additional lenses and in the base objective.

U.S. Pat. No. 5,214,532 discloses an achromatic two-lens accessory for thermal imaging apparatus to double the range. Aspheric lens elements are provided.

U.S. Pat. No. 5,229,880 discloses a reimager which is configured for three fields of view by omitting or inserting a first or second two-lens group behind the front lens of the objective. In the embodiments shown, this two-lens group has at least one diffractive optical element. Claim 9 of this patent, however, presents an embodiment without a diffractive optical element.

U.S. Pat. No. 5,257,133 describes a reimager having a diffractive optical element in the ocular as set forth in claim 1 or no diffractive optical element as set forth in claim 10. The use of aspheric lenses in the objective and ocular is shown and these aspheric lenses are made of silicon, that is, for a 3 to 5 $\mu$m wavelength. An interchangeable optic is not provided.

U.S. Pat. No. 5,363,235 discloses a catadioptric reimager having interchangeable lenses for switching the image field.

SUMMARY OF THE INVENTION

It is an object of the invention to provide a telescope of the kind described above which is adapted for use in thermal imaging apparatus. It is a further object of the invention to provide such a telescope which, for a compact configuration with as few lenses as possible, results in a system having interchangeable components for different fields of view and which is cost effective to manufacture.

The infrared Kepler telescope of the invention includes: an objective defining an optical axis and including a positive front group and a negative rear group all arranged on the optical axis; the objective further including an interchangeable optic interposed between the positive front group and the negative rear group; the interchangeable optic being configured to operate as a magnification changer; an ocular mounted on the optical axis rearward of the negative rear group; the rear group and the ocular being fixedly pregiven; the positive front group being a first positive front group and being exchangeable with at least a second positive front group; the interchangeable optic being a first interchangeable optic and being exchangeable with at least a second interchangeable optic; and, the first and second positive front groups being optically so configured that each one of the positive front groups undercorrects spherical aberration and coma forward of the negative rear group to the same extent with or without the interchangeable optic.

The afocal optical system of the invention defines an intermediate image plane and a real exit pupil. The afocal optical system includes: an objective having a focal length and defining an optical axis; the objective having a structural length and being configured as a telesystem including a positive front group and a negative rear group; the positive front group and the negative rear group conjointly defining a telefactor (TF) of less than 0.7 wherein the telefactor is the ratio of the structural length of the objective to the focal length thereof; an ocular defining a focal length and including at least two lenses arranged on the optical axis; the image plane and the real exit pupil defining a distance therebetween and the distance being greater than the focal length of the ocular by a factor of at least 1.3; and, the positive front group being exchangeable for changing the magnification of the system.

The afocal optical system according to another embodiment of the invention defines an intermediate image plane and a real exit pupil and the afocal optical system includes: an objective having a focal length and defining an optical axis; the objective having a structural length and being configured as a telesystem including a positive front group and a negative rear group; the positive front group and the negative rear group conjointly defining a telefactor (TF) of less than 0.7 wherein the telefactor is the ratio of the structural length of the objective to the focal length thereof; an ocular defining a focal length and including at least two lenses arranged on the optical axis; the image plane and the real exit pupil defining a distance therebetween and the distance being greater than the focal length of the ocular by a factor of at least 1.3; and, an interchangeable optic having at least two lenses and the interchangeable optic being insertable into the optical axis between the positive front group and the negative rear group for changing the magnification.

The method of the invention is for making an infrared Kepler telescope having a field-of-view as required. The method includes the steps of: fixedly pregiving a negative objective rear group and an ocular having overcorrected spherical aberration and coma; and, providing a positive objective front group configured in correspondence to the field-of-view.

The Kepler telescope according to the invention includes an objective and an ocular. The objective has adapted lens components which are arranged forward of the negative rear group of the objective. A permanent base optic of the Kepler telescope includes the negative rear group and an interface position between the permanent base optic and the adapted lens elements is provided forward of the rear group. A specific correction is provided at the interface position and especially spherical aberration and coma are undercorrected.

BRIEF DESCRIPTION OF THE DRAWINGS

The invention will now be described with reference to the drawings wherein:

FIG. 1 is a Kepler telescope according to a first embodiment of the modular Kepler telescope of the invention and includes the front group described in Table 1a;

FIG. 2 is a second embodiment of the modular Kepler telescope according to the invention and includes the front group described in Table 2;

DESCRIPTION OF THE PREFERRED EMBODIMENTS OF THE INVENTION

Figure 3:
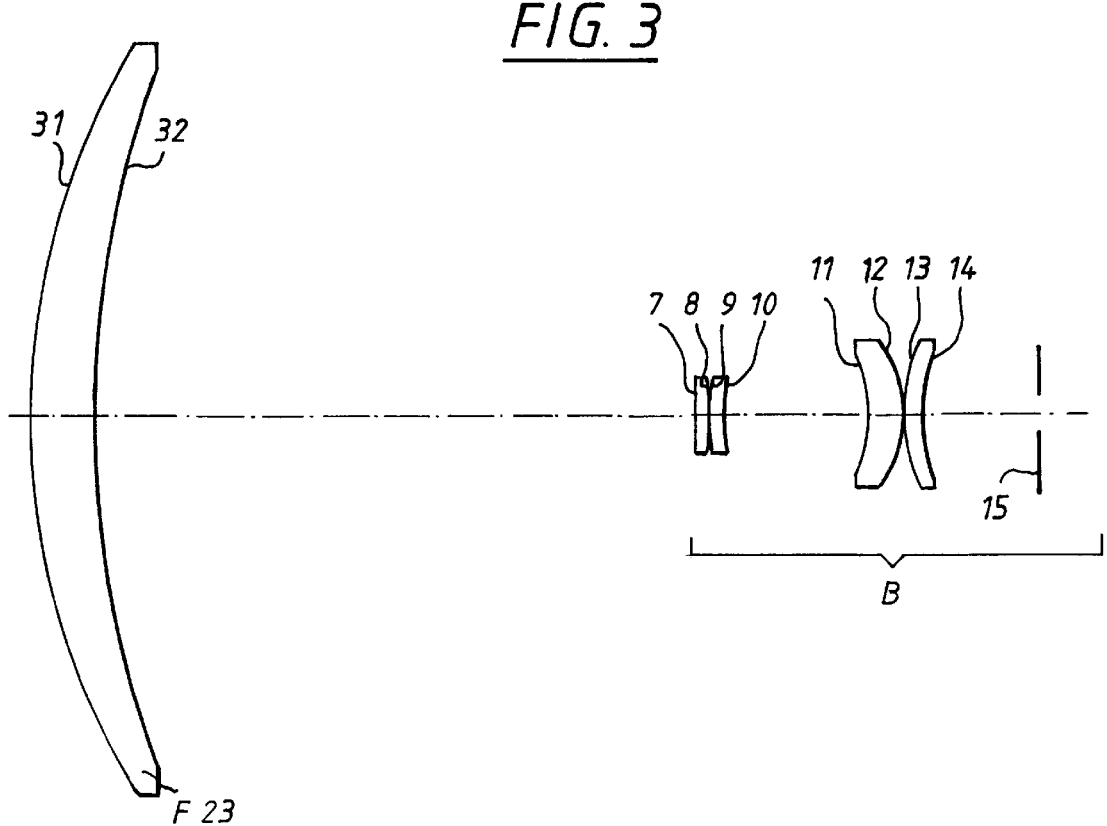
FIG. 3 is a third embodiment of the modular Kepler telescope according to the invention and includes the front group described in Table 3.
Figure 4:
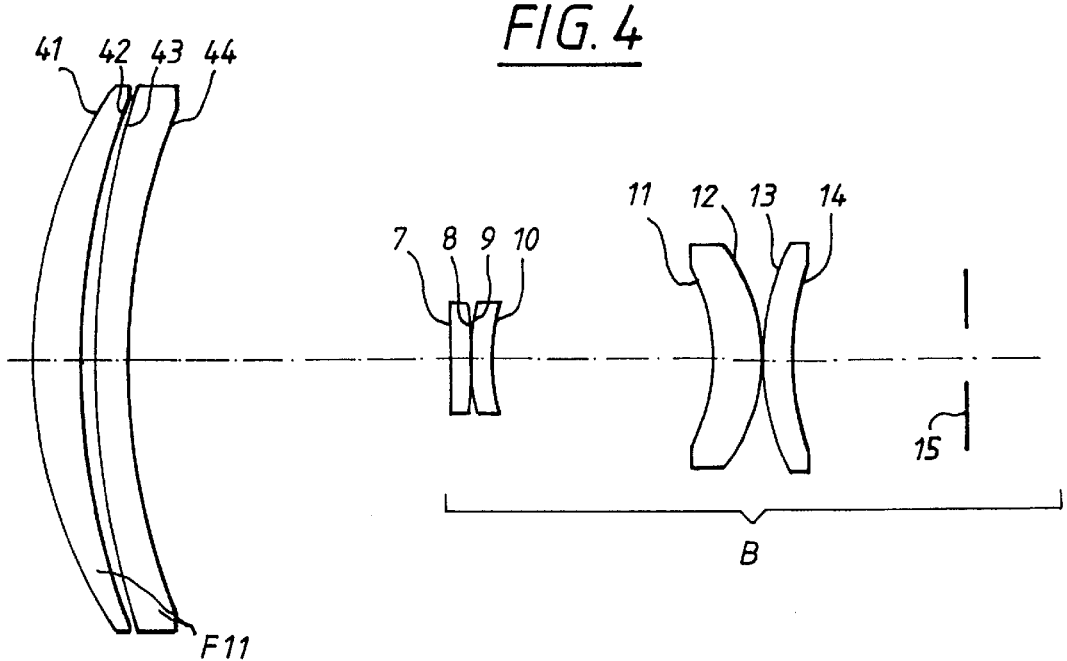
FIG. 4 shows a fourth embodiment of the modular Kepler telescope of the invention and includes the front group described in Table 4.

The embodiment of FIG. 1 shows the configuration of the Kepler telescope including objective Ob having converging front group F12, optional interchangeable optic W11 and diverging rear group H as well as the ocular Ok. The ocular Ok and the rear group H conjointly define the fixed base optic B. The front group F12 and the interchangeable optic W11 are exchangeable. However, the front group F12 is selected once and is permanently connected to the base optic B. The interchangeable optic W11 can, however, be inserted during operation and is pivoted in about rotational axis 17 utilizing a suitable mechanical device M wherein several different optics are mounted of which $W_x$ is representative.

The base optic B comprises the rear group H having a spherical converging lens made of ZnS with surfaces (7, 8) and a spherical diverging lens made of Germanium (Ge) with surfaces (9, 10). The focal length of the rear group H is −18 mm and this rear group is so positioned in the beam path that it effects a two-fold magnification. The intermediate image 27 between the rear group H and the ocular Ok is not corrected.

The ocular Ok includes two aspherical converging lenses having surfaces (11, 12; 13, 14) made of Ge. The lenses are configured to define mutually adjacent menisci. The focal length of the ocular Ok is approximately +22 mm.

The front group F12 is a converging individual lens having surfaces (1, 2) and being made of Germanium. The surface 2 of this lens is a diffractive surface.

The inserted interchangeable optic W11 includes a spherical diverging lens having surfaces (3, 4) and a converging lens having surfaces (5, 6) of which surface 6 is aspherical. Both lenses are likewise made of Germanium.

Table 1a presents the construction data for all components of the telescope. The exit pupil 15 is permanently pregiven having a diameter of 10 mm. The image plane 16 is shown rearward of the exit pupil 15.

The aspherical and diffractive surfaces are now described according to the following invention.

A rotationally symmetric aspherical deformation is superposed on a spherical surface having the radius R. This deformation is given as a sagitta difference pD of the aspherical surface to the spherical surface and is a function of the distance h from the optical axis. The basic form is a parabola in all embodiments so that the following formula results with the aspherical constants $c_1$ to $C_n$:

$$pD(h) = (\tfrac{1}{2}R)h^2 + c_1 h^4 + \ldots + c_n h^{2n+2}.$$

The diffractive groove profile is, if required, superposed and is a function of the distance h from the optical axis and is repeated periodically up to the maximum groove depth T.

The diffractive cut pD(h) is computed for the embodiments as follows:

$$pD(h) = T \cdot (N(b) - \text{integer } N(h))$$

wherein the maximum groove depth $T = WL/(n-1)$ and number of grooves $N(h) = D_1(h^2)/WL$.

In the above:

WL=blaze wavelength which is here WL=9μm

N=refractive index of the lens p1 $D_1$=diffractive constant. For the above, the constants are presented in the tables.

In Table 1b, the variations of front groups F11 to F31 provided for one embodiment are presented. The front groups F11 to F31 are shown in the lens sections of FIGS. 1 to 6 and are described in corresponding Tables 1a and 2 to 6. All front groups only need two lenses with an aspherical surface or only one lens having a diffractive surface.

The data in the column headed "Gamma" in Table 1b is the magnification of the entire telescope and "EPD" is the entry pupil diameter. f' is the focal length of the objective Ob with the particular front groups F11 to F31.

Figure 5:
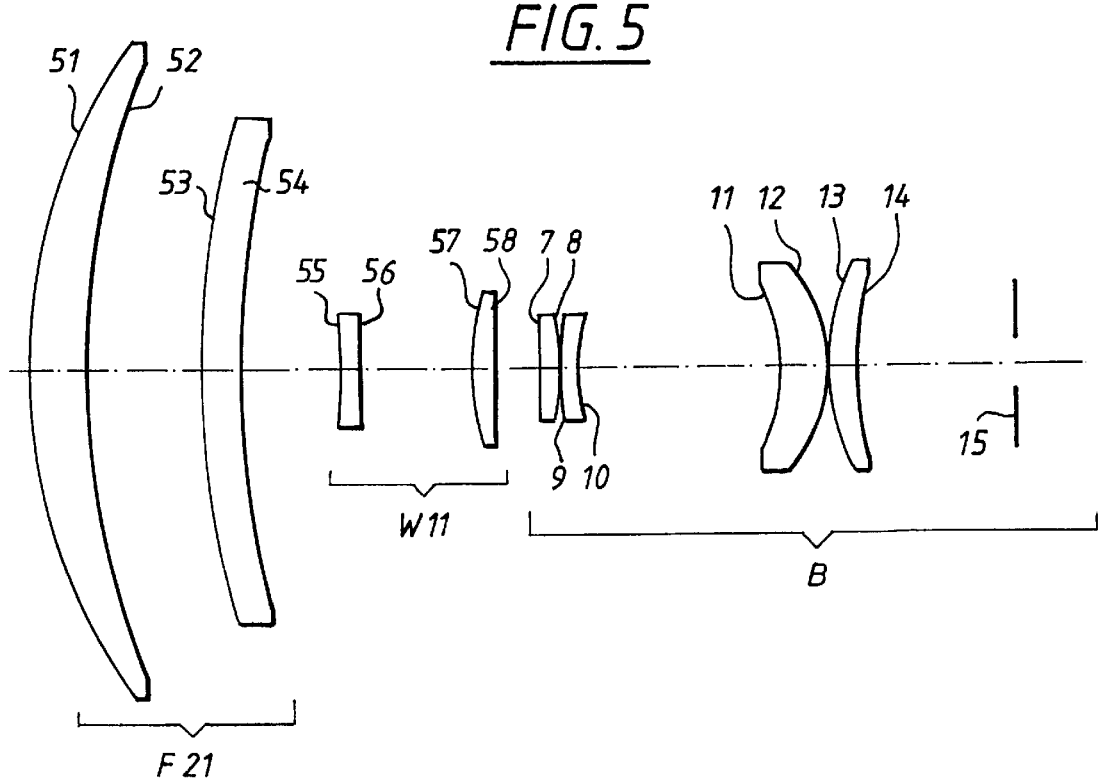
FIG. 5 shows a fifth embodiment of the modular Kepler telescope of the invention and includes the front group described in Table 5; and, FIG. 6 shows a sixth embodiment of the modular Kepler telescope of the invention and includes the front group described in Table 6.
Figure 6:
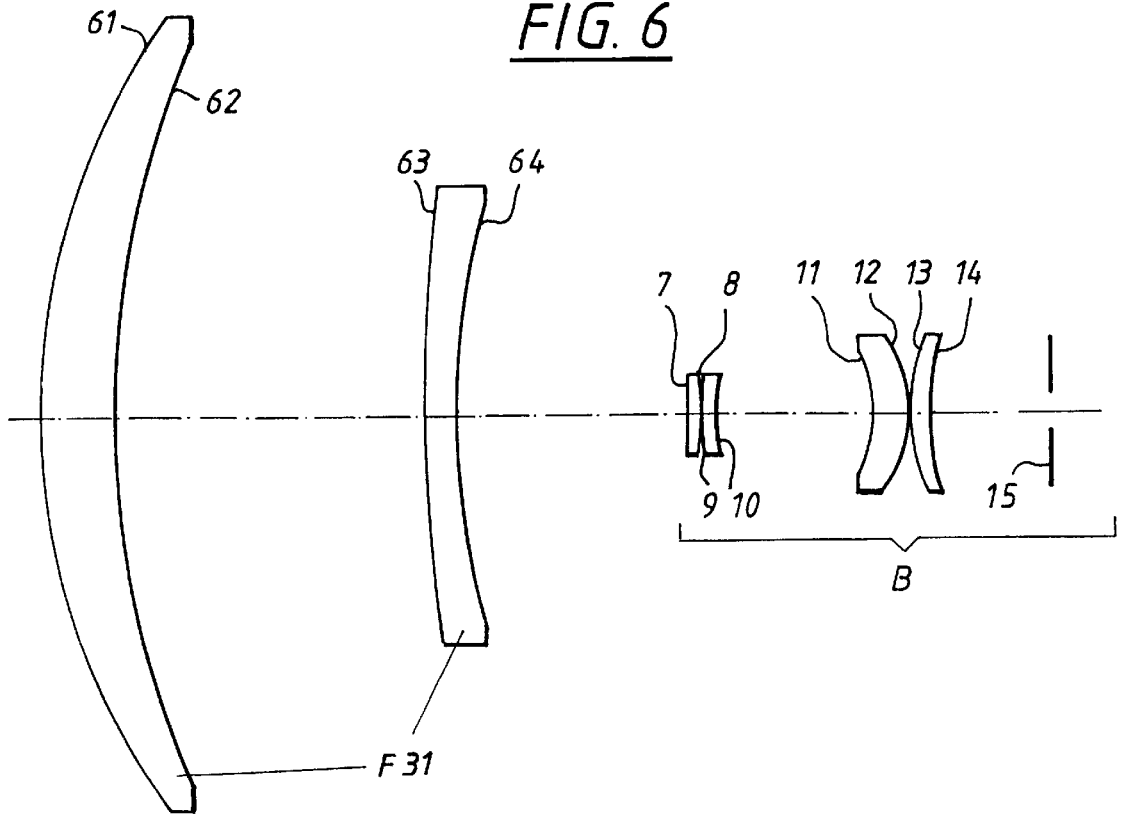

Two interchangeable optics W11, W21 can be combined with the above and are defined by a spherical diffracting lens having surfaces (3, 4) and an aspherical converging lens having surfaces (5, 6), both made of Germanium. W11 has an expansion factor of 1:3.4 for a structural length of approximately 30 mm. W21 has an expansion factor of 1:5.4 for a structural length of approximately 45 mm. W11 is shown in FIGS. 1 and 5 and is included in Table 1a. W21 is shown in FIG. 2 and is described in greater detail in Table 2.

What is important is that in all combinations of the front groups (F11 to F31) and the interchangeable optics (W11, W21), the correction of the total system is always good and that the spherical aberration and the coma are both always equally undercorrected at the transition location to base optic B.

In Tables 2 to 6, the lens data of different front groups F11 and F21 to F31 are presented. The lens data of alternative interchangeable optics W21 are presented in Table 2. The front groups and interchangeable optics can be combined with rear group H and the ocular Ok as desired. Other embodiments and combinations are also possible.

The distortion is influenced by introducing the interchangeable optics W11, W21 for reducing the field of view. For example, in FIG. 1, the distortion is negative with interchangeable optic W11; however, without optic W11, the distortion is weakly positive.

The intermediate image after objective Ob is deliberately not completely corrected; instead, individual image errors are compensated by the ocular Ok.

Spherical aberration and coma are preferably almost completely diffraction-limited corrected. The rear group H here compensates the undercorrection of the front groups F11 to F31. The astigmatism is negative, that is, the tangential focus lies farther forward of the intermediate image plane than the sagittal focus. The image field curvature is slightly positive and much less than the astigmatism. The pupil aberration is corrected by the compensation of the front groups F11 to F31 by the rear group H.

In the ocular Ok, the two menisci having surfaces (11, 12; 13, 14) function to keep the image field curvature low. The Petzval radius of the ocular Ok can thereby become significantly greater (here approximately seven times greater) than the focal length of the ocular Ok. The outer surfaces are concave. In this way, the ocular Ok can compensate the image errors of the objective Ob and the system remains insensitive with respect to manufacturing tolerances. At least one aspherical surface is required to correct the pupil aberration. As aspherical surfaces, the following are selected: the concave surface 11 facing toward the intermediate image and the surface 14 facing toward the exit pupil 15. This correction of the pupil aberration prevents vignetting and avoids overapertures (excess diameters) of the large front lenses.

The configuration has an overall low sensitivity with respect to manufacturing tolerances because the correction is less critical. The configuration is cost effective because Germanium is used almost exclusively. The number of lenses as well as the number of aspherical surfaces is minimal and no aspherical surfaces are manufactured on toxic material (ZnSe, chalcogenide glasses).

In addition to Germanium, ZnS or ZnSe as well as chalcogenide glasses are utilized in individual cases because of the higher dispersion. The rear group H effects magnification of at least 1.6 and has adequate air space so that it can be displaced longitudinally for focussing on close objects as internal focussing as well as also for active athermalization in the conventional range of −40° C. to +70° C. Thus, the lenses having surfaces (7, 8; 9, 10) can be displaced along longitudinal axis 18 via a holder 19 in the direction of double arrow 20 for focussing. The rear group H can also comprise only one lens.

The embodiments described are provided for the spectral range from 7.5 $\mu$m to 10.5 $\mu$m and are achromatized for this purpose.

The invention, however, can also be applied in the spectral range from 3 $\mu$m to 5 $\mu$m and is then based on silicon as a lens material.

It is understood that the foregoing description is that of the preferred embodiments of the invention and that various changes and modifications may be made thereto without departing from the spirit and scope of the invention as defined in the appended claims.

TABLE 1a

| No. | Radius | Thickness | Glass | C1 | C2 | C3 | C4 | D1 |
|---|---|---|---|---|---|---|---|---|
| | | | | Objective Front Group F12 | | | | |
| 1 | 96.450 | 8.0 | Ge | — | — | — | — | — |
| 2 | 140.827 | 27.6 | Air | 0.60e−07 | −0.72e−12 | 0.11e−14 | −0.17e−18 | −0.16e−04 |
| | | | | Interchangeable Optic W11 | | | | |
| 3 | −122.117 | 3.6 | Ge | — | — | | | |
| 4 | 174.267 | 23.2 | Air | — | — | (Expansion Factor 1:3.4) | | |
| 5 | 53.727 | 4.3 | Ge | −0.10e−05 | −0.16e−10 | | | |
| 6 | 1163.840 | 9.4 | Air | — | — | | | |
| | | | | Objective Rear Group H | | | | |
| 7 | −501.449 | 4.0 | ZnSe | | | | | |
| 8 | −210.068 | 0.2 | Air | | | | | |
| 9 | 110.868 | 3.5 | Ge | | | | | |
| 10 | 40.794 | 42.0 | Air | | | | | |
| | | | | Ocular Ok | | | | |
| 11 | −39.094 | 9.5 | Ge | −0.13e−04 | 0.19e−07 | −0.18e−10 | | |
| 12 | −33.874 | 0.2 | Air | — | — | — | | |
| 13 | 48.179 | 5.5 | Ge | — | — | — | | |
| 14 | 60.000 | 33.0 | Air | −0.59e−05 | 0.12e−07 | −0.90e−11 | | |

TABLE 1b

| Variant | Configuration | Gamma | EPD | f′ | FIG. | Table |
|---|---|---|---|---|---|---|
| F11 | aspherical converging lens of Ge and spherical diverging lens of ZnSe | 9.0 | 90 mm | appr. 200 mm | 4 | 4 |
| F12 | Diffractive converging lens of Ge | 9.0 | 90 mm | appr. 200 mm | 1 | 1a |
| F21 | aspherical converging lens of Ge and spherical diverging lens of ZnSe | 11.7 | 117 mm | appr. 255 mm | 5 | 5 |
| F22 | diffractive converging lens of Ge | 11.7 | 117 mm | appr. 255 mm | 2 | 2 |
| F31 | aspherical converging lens of Ge and spherical diverging lens of ZnSe | 20.0 | 200 mm | appr. 435 mm | 6 | 6 |
| F23 | diffractive converging lens of Ge | 20.0 | 200 mm | appr. 435 mm | 3 | 3 |

TABLE 2

| No. | Radius | Thickness | Glass | C1 | C2 | C3 | C4 | D1 |
|---|---|---|---|---|---|---|---|---|
| | | | | F22 | | | | |
| 21 | 125.139 | 10.3 | Ge | — | — | — | — | — |
| 22 | 183.377 | 52.0 | Air | 0.27e−07 | 0.24e−12 | 0.71e−16 | −0.73e−20 | −0.13e−04 |
| | | | | W21 | | | | |
| 23 | −84.054 | 3.6 | Ge | | | | | |
| 24 | 343.579 | 35.0 | Air | — | — | | | |
| 25 | 49.380 | 4.3 | Ge | −0.81e−06 | −0.99e−10 | | | |
| 26 | 392.240 | 9.4 | Air | — | — | | | |

TABLE 3

| | | | F23 | | | | |
|---|---|---|---|---|---|---|---|
| No. | Radius | Thickness | Glass | C1 | C2 | C3 | C4 | D1 |
| 31 | 216.154 | 17.8 | Ge | — | — | — | — | — |
| 32 | 318.359 | 129.1 | Air | 0.54e–08 | 0.46e–13 | 0.14e–17 | 0.50e–22 | –0.77e–05 |

TABLE 4

| | | | F11 | | | |
|---|---|---|---|---|---|---|
| No. | Radius | Thickness | Glass | C1 | C2 | C3 |
| 41 | 98.296 | 9.0 | Ge | | | |
| 42 | 150.469 | 2.5 | Air | +0.50e–07 | –0.54e–12 | +0.39e–15 |
| 43 | 183.265 | 6.0 | ZnSe | — | — | — |
| 44 | 155.888 | 20.2 | Air | — | — | — |

TABLE 5

| | | | F21 | | | |
|---|---|---|---|---|---|---|
| No. | Radius | Thickness | Glass | C1 | C2 | C3 |
| 51 | 124.154 | 11.5 | Ge | — | — | — |
| 52 | 189.838 | 23.7 | Air | 0.25e–07 | 0.83e–13 | 0.35e–16 |
| 53 | 221.920 | 7.0 | ZnSe | — | — | — |
| 54 | 176.808 | 20.7 | Air | — | — | — |

TABLE 6

| | | | F31 | | | |
|---|---|---|---|---|---|---|
| No. | Radius | Thickness | Glass | C1 | C2 | C3 |
| 61 | 189.55 | 20.0 | Ge | — | — | — |
| 62 | 281.113 | 82.4 | Air | 0.68e–08 | 0.40e–13 | 0.47e–19 |
| 63 | 509.879 | 9.0 | ZnSe | — | — | — |
| 64 | 257.738 | 21.7 | Air | — | — | — |

What is claimed is:

1. An afocal optical system defining an intermediate image plane and a real exit pupil, the afocal optical system comprising:
    an objective having a focal length and defining an optical axis;
    said objective having a structural length and being configured as a telesystem including a positive front group and a negative rear group;
    said positive front group and said negative rear group conjointly defining a telefactor (TF) of less than 0.7 wherein said telefactor is the ratio of said structural length of said objective to said focal length thereof;
    an ocular defining a focal length and including at least two lenses arranged on said optical axis;
    said image plane and said real exit pupil defining a distance therebetween and said distance being greater than said focal length of said ocular by a factor of at least 1.3; and,
    a plurality of lenses arranged in front of said negative rear group and being exchangeable for changing the magnification of said system.

2. The afocal optical system of claim 1, wherein said positive front group includes said plurality of lenses and said positive front group is exchangeable for changing the magnification of said system.

3. The afocal optical system of claim 2, said two lenses of said ocular having a curvature so that the Petzval radius of said ocular is at least six times greater than said focal length of said ocular.

4. The afocal optical system of claim 2, said positive front group being configured as a two-lens component made of germanium or silicon and a second material having a dispersion greater than said germanium or silicon thereby correcting chromatic longitudinal deviations (CHL).

5. The afocal optical system of claim 4, said second material being ZnSe, ZnS or chalcogenide glass.

6. The afocal optical system of claim 2, said positive front group comprising a single lens having a diffractive surface.

7. The afocal optical system of claim 6, said single lens being made of germanium or silicon.

8. The afocal optical system of claim 2, said negative rear group comprising a single lens.

9. The afocal optical system of claim 8, said single lens being made of germanium or silicon.

10. The afocal optical system of claim 2, said negative rear group comprising a negative lens made of germanium or silicon and a positive lens made of a material having a dispersion greater than germanium or silicon.

11. The afocal optical system of claim 10, said material of said positive lens being selected from the group consisting of ZnSe, ZnS and chalcogenide glass.

12. The afocal optical system of claim 2, said negative rear group having lenses defining only spherical surfaces.

13. The afocal optical system of claim 2, said negative rear group having sufficient air space to the other groups to facilitate a focussing of said system on a close object and to permit active athermalization in a temperature range of –40° C. to +70° C.

14. The afocal optical system of claim 2, said negative rear group being mounted along said optical axis so as to effect at least a magnification by the factor of 1.6.

15. The afocal optical system of claim 2, said positive front group comprising a diffractive diverging lens made of germanium or silicon and a positive lens made of a material having a temperature-dependent variation of the refractive index less than said germanium so as to athermalize said system by a selection of said material and to simultaneously achromatize said system via the diffractive surface of said diverging lens.

16. The afocal optical system of claim 15, said material being selected from the group consisting of ZnSe, ZnS and chalcogenide glass.

17. The afocal optical system of claim 1, wherein said plurality of lenses are at least two in number; and, said afocal optical system further comprises an interchangeable optic including said at least two lenses and said interchangeable optic being insertable into said optical axis between said positive front group and said negative rear group for changing said magnification.

18. The afocal optical system of claim 17, said two lenses of said ocular having a curvature so that the Petzval radius of said ocular is at least six times greater than said focal length of said ocular.

19. The afocal optical system of claim 17, said positive front group being configured as a two-lens component made of germanium or silicon and a second material having a dispersion greater than said germanium or silicon thereby correcting chromatic longitudinal deviations (CHL).

20. The afocal optical system of claim 19, said second material being ZnSe, ZnS or chalcogenide glass.

21. The afocal optical system of claim, 17, said positive front group comprising a single lens having a diffractive surface.

22. The afocal optical system of claim 21, said single lens being made of germanium or silicon.

23. The afocal optical system of claim 17, said negative rear group comprising a single lens.

24. The afocal optical system of claim 23, said single lens being made of germanium or silicon.

25. The afocal optical system of claim 17, said negative rear group comprising a negative lens made of germanium or silicon and a positive lens made of a material having a dispersion greater than germanium or silicon.

26. The afocal optical system of claim 25, said material of said positive lens being selected from the group consisting of ZnSe, ZnS and chalcogenide glass.

27. The afocal optical system of claim 17, said negative rear group having lenses defining only spherical surfaces.

28. The afocal optical system of claim 17, said negative rear group having sufficient air space to the other groups to facilitate a focussing of said system on a close object and to permit active athermalization in a temperature range of −40° C. to +70° C.

29. The afocal optical system of claim 17, said negative rear group being mounted along said optical axis so as to effect at least a magnification by the factor of 1.6.

30. The afocal optical system of claim 17, said positive front group comprising a diffractive diverging lens made of germanium or silicon and a positive lens made of a material having a temperature-dependent variation of the refractive index less than said germanium so as to athermalize said system by a selection of said material and to simultaneously achromatize said system via the diffractive surface of said diverging lens.

31. The afocal optical system of claim 30, said material being selected from the group consisting of ZnSe, ZnS and chalcogenide glass.

\* \* \* \* \*

UNITED STATES PATENT AND TRADEMARK OFFICE
CERTIFICATE OF CORRECTION

PATENT NO. : 6,246,516 B1
DATED : June 12, 2001
INVENTOR(S) : Wilhelm Ulrich

It is certified that error appears in the above-identified patent and that said Letters Patent is hereby corrected as shown below:

<u>Column 3,</u>
Line 58, delete "$C_n$" and substitute -- $c_n$ -- therefor.

<u>Column 4,</u>
Line 5, delete "p1".
Table 3, last line, delete "0.14e-17" and substitute -- -0.14e-17 -- therefor.

Signed and Sealed this

Sixteenth Day of April, 2002

Attest:

JAMES E. ROGAN
Director of the United States Patent and Trademark Office

*Attesting Officer*